United States Patent

Lehovec et al.

[15] 3,704,376

[45] Nov. 28, 1972

[54] PHOTO-ELECTRIC JUNCTION FIELD-EFFECT SENSORS

[72] Inventors: Kurt Lehovec; William G. Seeley, both of Williamstown, Mass.

[73] Assignee: Inventors & Investors, Inc., Williamstown, Mass.

[22] Filed: May 24, 1971

[21] Appl. No.: 146,322

[52] U.S. Cl. ........250/211 J, 250/220 M, 317/235 N

[51] Int. Cl. .......H01j 39/12, H01l 11/00, H01l 15/00

[58] Field of Search.....250/211 J, 220 M; 317/235 N

[56] References Cited

UNITED STATES PATENTS 3,453,507 7/1969 Archer..................250/220 M

*Primary Examiner*—James W. Lawrence

*Assistant Examiner*—T. N. Grigsby

[57] ABSTRACT

The invention concerns improved semiconducting light sensors based on field effect transistor structures. A potential extremum is generated in the channel by illumination and its shift is used as vehicle for minority carrier transport. Photosensitive field effect transistors are integrated with minority carrier sensors.

26 Claims, 12 Drawing Figures

PHOTO-ELECTRIC JUNCTION FIELD-EFFECT SENSORS

BACKGROUND OF THE INVENTION

This invention concerns an improved semiconducting sensor of radiation. In particular, this invention concerns a sensor of radiation having a conducting channel in which a potential extremum is created by illumination.

The sensor of this invention has applications as an optically regulated potentiometer, as an electrical or optical indicator of the position of a luminous object, and as a means to generate a minority carrier charge in a semiconducting channel and to transport it to a desired position for performing an electrical circuit function.

It is well-known that a photocurrent can be generated in a semiconductor by photoelectrically released electrons and holes which are separated by an electric field, such as it exists in a p-n junction, in the Schottky barrier between a metal and a semiconductor, in a surface depletion layer caused by suitable surface states or induced by an electric field impinging on the surface.

J. T. Wallmark in a paper published in the Proceedings of the Institute of Radio Engineers, Vol. 45, pp. 474–83 (1957) has described a device comprising a semiconducting channel of one conductivity type lined by a layer of the opposite conductivity type, with two contacts to the ends of the channel and another contact to the layer of the opposite conductivity type. He has shown that non-uniform illumination of the p-n junction between channel and layer of opposite conductivity type leads to a transverse photo-effect between the channel electrodes, which is indicative of the non-uniform illumination.

In the case of an illuminated spot only, the photoelectric output of Wallmark's device depends on the intensity of the illumination and on the position of the illuminated spot, as well as on the potentials applied at the terminals of the channel. For some applications, e.g., for tracking of the position of a bright luminous point source, it is desirable to have an output which depends only on the position of illumination, but is independent of light intensity and of terminal voltages within wide margins.

S. R. Morrison has described in Solid-State Electronics, Vol. 5, pp. 485–94 (1963) a more complicated structure comprising a channel of one conductivity type separated from a layer of the same conductivity type by a sandwiched layer of opposite conductivity type, thus having two parallel p-n junctions. Two electrodes were applied to the ends of the channel, and one electrode to said spaced layer of equal conductivity type, while the sandwiched layer was left electrically floating. Morrison showed that when illuminating one junction, the device may be used as a photoelectrically regulated potentiometer, and as an indicator of the position of the illumination. Morrison specified that the sandwiched layer has to be sufficiently thick that no transistor-like interaction between currents flowing across its junction boundaries occurs. No restrictions on maximum thickness were imposed on the layers of Wallmark and Morrison.

BRIEF DESCRIPTION OF THIS INVENTION

It is an object of this invention to describe an improved electric sensor for non-uniform illumination.

It is another object of this invention to describe an improved network of sensors.

It is another object to describe a sensor of radiation, providing visible indication of a position in a conducting channel.

It is still another object off this invention to describe an electric sensor of radiation capable of generation and of transfer of a minority carrier charge to activate a semiconducting device or circuit.

These and other objects and their realization will become obvious from the following description.

This invention utilizes photoelectric effects in a field effect transistor device comprising a narrow semiconducting channel susceptible to electric pinch off. The channel has a source and a drain electrode and is lined at one side by a depletion layer, such as exists in a p-n junction, in a Schottky barrier or between a surface inversion layer and the bulk of a semiconductor.

Means are provided for illumination by radiation generating a photocurrent across the depletion layer. The photocurrent changes the potential distribution along the channel, and thereby the width of the depletion layer.

The source and drain currents become independent of the source and drain voltages applied at the channel terminals if these voltages are sufficiently large to pinch off the channel. These currents also become independent of the intensity of spot illumination for light intensities sufficiently high to forward bias the illuminated channel section against an adjacent gate. The saturation or cut-off photocurrents so obtained depend, however, on the position of the illuminated spot.

Injection of minority carriers at the forward biased gate section can be used for injection luminescence, or else to activate minority carrier sensors arranged along the channel.

A structure comprising a gate substrate of one conductivity type, carrying a multiplicity of channels of the other conductivity type, which channels are crossed by a multiplicity of minority carrier collectors provides a simple two-dimensional sensor network, which defines the position of an illuminated point by the photo output of a particular channel and a particular collector.

Sufficiently strong illumination is capable to produce a potential extremum in the channel which is capable of retaining minority carriers. Moreover, the position of the extremum can be shifted by change in illumination, by change of terminal voltages at the channel or by a combination of both. Minority carriers contained in the potential extremum can thus be shifted to activate devices arranged along the channel.

PREFERRED EMBODIMENTS

Figures 1, 3, 4:
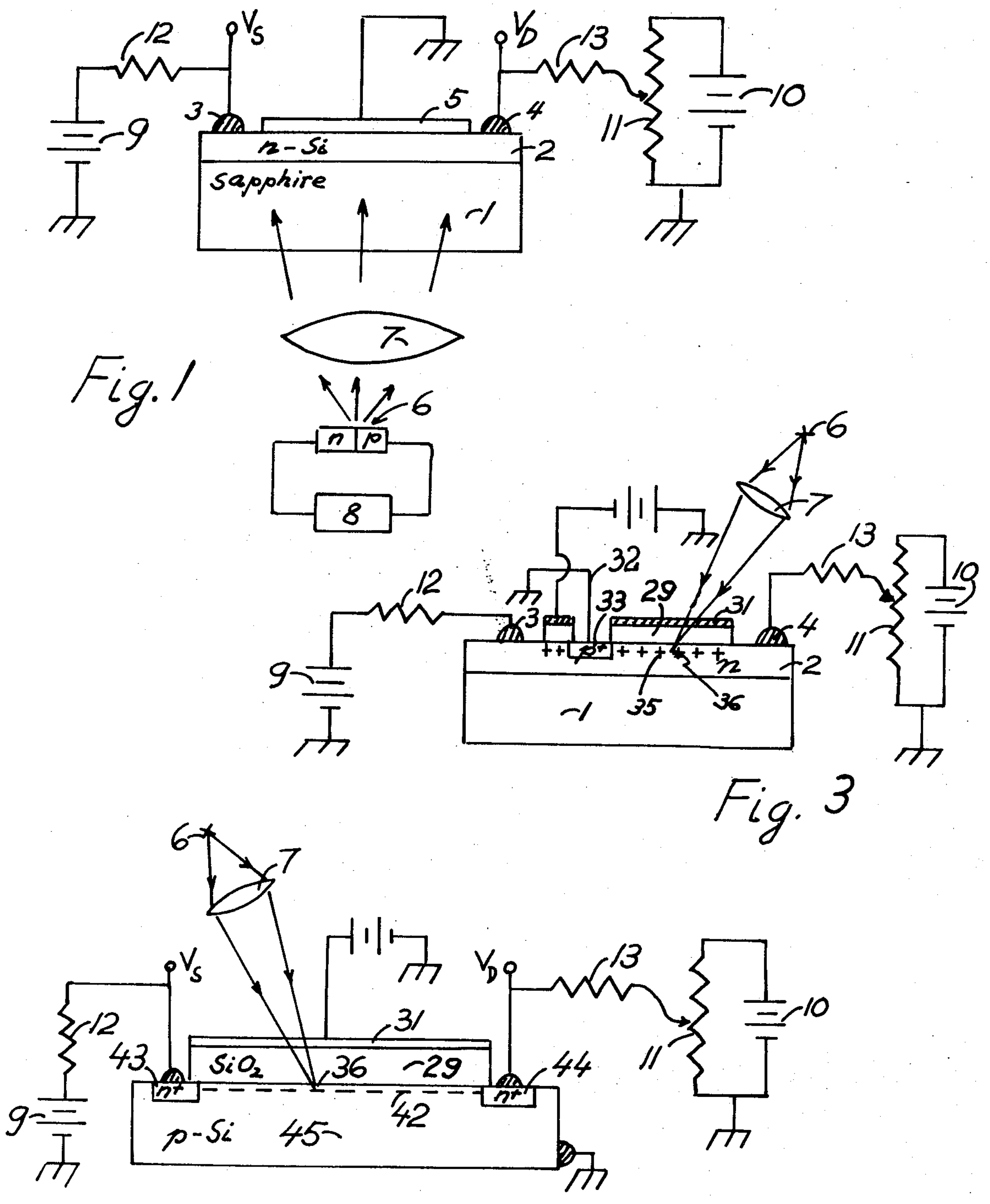
FIG. 1 shows in cross section a device according to this invention.
FIG. 3 shows still another device of this invention having an inversion layer gate.
FIG. 4 shows yet another device according to this invention having an induced inversion channel.

All embodiments of the invention include an illuminated field effect transistor. Each field effect transistor has a semiconducting channel, separated by a depletion layer from a gate region. The gate region can be a semiconducting region of the opposite conductivity type than that of the channel, arising from different dopant impurities, or else an induced inversion region; the gate region can also be a Schottky barrier contact to the channel.

In another preferred embodiment, the channel can be the induced inversion region and the gate the semiconducting substrate.

Some embodiments of the invention include sensors for minority carriers in the channel arranged along the channel. These sensors can be p-n junction diodes, Schottky barrier diodes or metal-insulator-semiconductor capacitors.

Illumination provided to generate a photoelectric current source or sources to the channel can impinge on the device from the side of the gate region, or else from the side of the channel region. In the case of illumination impinging from the side of the gate region, the gate region must be comparatively thin in order that photoelectrically generated carriers are able to reach the channel.

The illumination can be restricted to a small portion of the channel, or else it can impinge on the entire channel. In certain embodiments of the invention, provisions are made to vary the illumination. The illumination may come from an electrically activated light source being part of the inventive device or from a luminescent body whose position is to be electrically recorded by the inventive device. The wavelength of illumination must be sufficiently short to provide a photocurrent entering the channel from the gate. In the case of a p-n junction type gate channel configuration, or else, of an inversion layer-substrate type gate channel configuration the illumination must be of a wavelength capable of generating electron hole pairs in the body of the semiconductor. In the case of a Schottky barrier gate, the illumination can be of a somewhat longer wavelength, which is still capable of releasing carriers from the Schottky barrier metal into the semiconducting channel without necessarily generating electron-hole pairs in the semiconducting body.

While field effect transistors are substantially majority carrier devices, some of the inventive embodiments utilize minority carriers injected into the channel in combination with sensors for minority carriers along the channel. Each sensor comprises a potential barrier having a field direction which repulses the majority carriers and attracts the minority carriers. Such barriers include p-n junctions, Schottky barriers, and inversion layer barriers. Electrical sensing may comprise current or voltage changes caused by minority carriers, or else capacitive effects.

Since there is wide variety in combination of field effect structures, sensor types and illumination arrangements, only a few preferred combinations are shown in the illustrations. However, it should be understood that this does not limit the scope of the invention.

For better understanding of the operational features of the inventive structures, a few comments on the well-known electrical characteristics of unilluminated field effect transistors will be made. Generally, the current through a field effect transistor is of the type $T = F(L, V_S, V_D)$, where $L$ is the channel length, $V_S$ is the source to gate voltage and $V_D$ is the drain to gate voltage. The channel is pinched off for $V_D \geq V_P$, the pinch-off voltage, and the current saturates at $I_{sat} = F(L, V_S, V_P)$ for $V_D \geq V_P$.

The saturation current vanishes if the entire channel is pinched off, i. e., if $V_S \geq V_P$ also.

For an n-channel junction field effect transistor, the Shockley approximation provides $$F(L, V_S, V_D) = g/L[V_D - V_S - \tfrac{2}{3} V_P^{-1/2}(V_D^{3/2} - V_S^{3/2})] = F(L, O, V_D) - F(L, O, V_S),$$

where $g$ is the open channel conductance which depends on width and height of channel, its dopant concentration and the majority carrier mobility in the channel. The so-called junction built-in voltage has been neglected to simplify notation. For an n-channel device at grounded gate, $V_D$ and $V_S$ are positive values. Maximum saturation current occurs for $V_S = O$, and is $$I_{sat}^{max} = F(L, O, V_P) = gV_P/3L$$

Referring now to FIG. 1, there is shown in cross section an illuminated field effect transistor according to this invention comprising an insulating substrate 1 of sapphire carrying an n-type epitaxial silicon channel 2 of a few microns thickness having source and drain contacts 3 and 4 and metal Schottky barrier gate 5. P-N junction light source 6 illuminates channel 2 by means of lens 7. Provisions are made to electrically control the light output of 6 by means of variable power supply 8. Bias means 9 and 10 for source and drain against grounded gate 5 are indicated. Power supply 10 is adjustable by potentiometer 11. Load resistances 12 and 13 are indicated in the source and drain circuits.

Figures 2, 10:
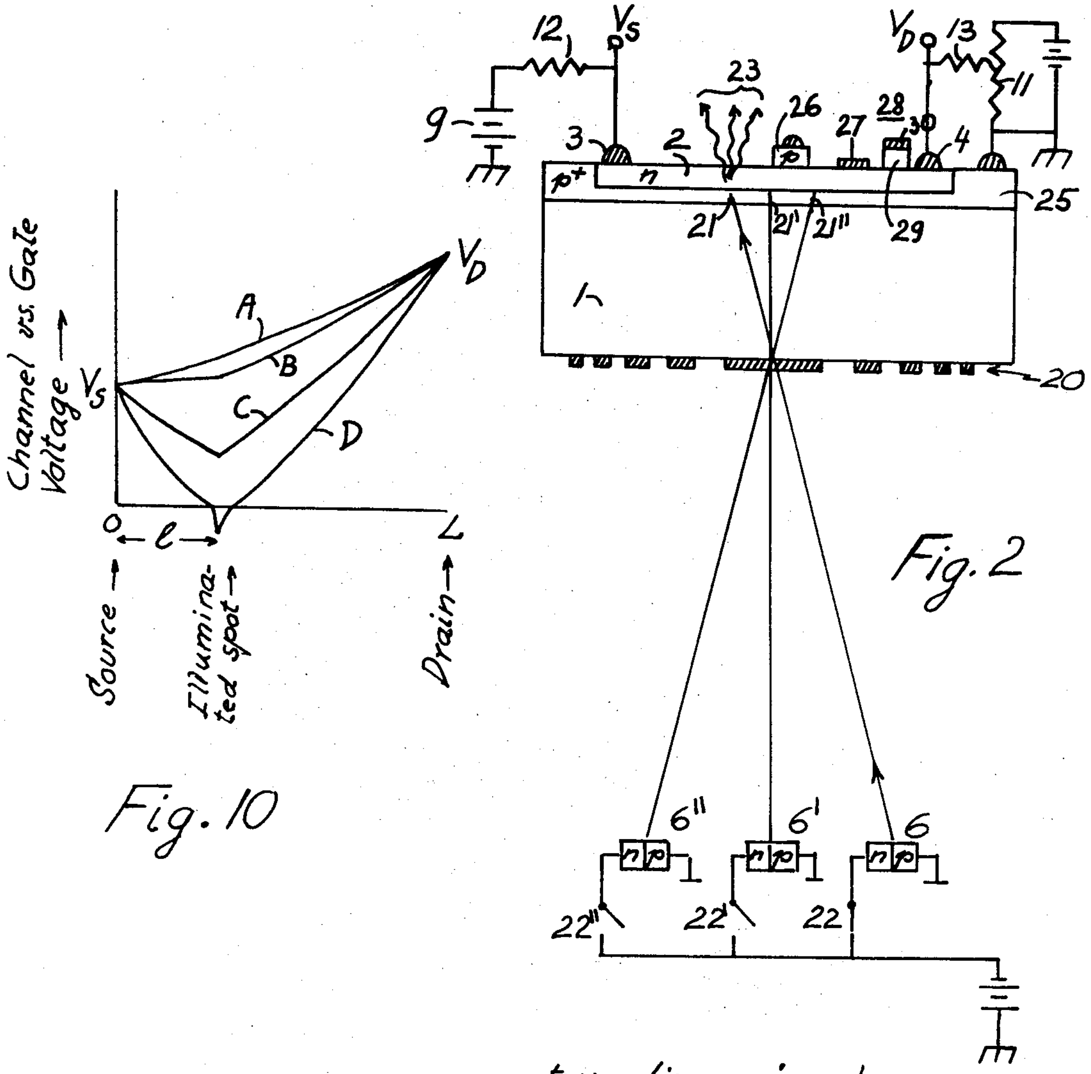
FIG. 2 shows in cross section another device of this invention having minority carrier sensors along a conducting channel and means for adjustable discrete illumination.
FIG. 10 illustrates the occurrence of a potential extremum along the channel of a device such as shown in FIG. 2.

FIG. 2 shows another preferred embodiment of this invention. The field effect transistor of FIG. 2 is of the p-n junction type, having grounded $p^+$ gate 25 inserted between n-channel 2 and substrate 1. Zone plate lens 20 focusses p-n junction light sources 6, 6′, 6″ on points 21, 21′, 21″ of gate 25. Switches 22, 22′, 22″ enable selection of the illuminated spot 21, 21′, 21″ along channel 2. In FIG. 2, spot 21 is illuminated by closing switch 22. This leads to a forward bias of the adjacent p-n junction, as will be explained later and to minority carrier (hole) injection from $p^+$ gate 25 into channel 2. Minority carriers injected into the channel cause recombination radiation 23. Also shown in FIG. 2 are three types of sensors for presence of minority carriers in channel 2; namely: p-n junction sensor 26; Schottky barrier sensor 27; and MOS sensor 28, which comprises the insulating film 29 and the metal contact 30.

FIG. 3 shows another device according to this invention, which comprises the insulating substrate 1 and the epitaxial silicon n-channel 2 with electrodes 3 and 4. The device differs from that of FIG. 1 in having a p-inversion layer gate 35 induced through silicon oxide film 29 by negatively biased transparent tin oxide electrode 31. Ground contact 32 to inversion layer 35 is made by means of $p^+$ land area 33. Light source 6 is focussed on point 36 of the depletion layer between 35 and 2 using lens 7.

FIG. 4 shows still another device according to this invention utilizing n-inversion layer channel 42 of an insulated gate field effect transistor on p-substrate 45.

The channel is induced through oxide 29 by positively biased electrode 31. Contacts 43 and 44 to induced n-channel 42 are $n^+$ land areas. Grounded p-substrate 45 serves as gate and is separated from channel 42 by a depletion layer. Illumination of point 36 by light source 6 through lens 7 generates a photocurrent across the adjacent depletion layer by flow of electrons into channel 42 from 45.

Figure 5:
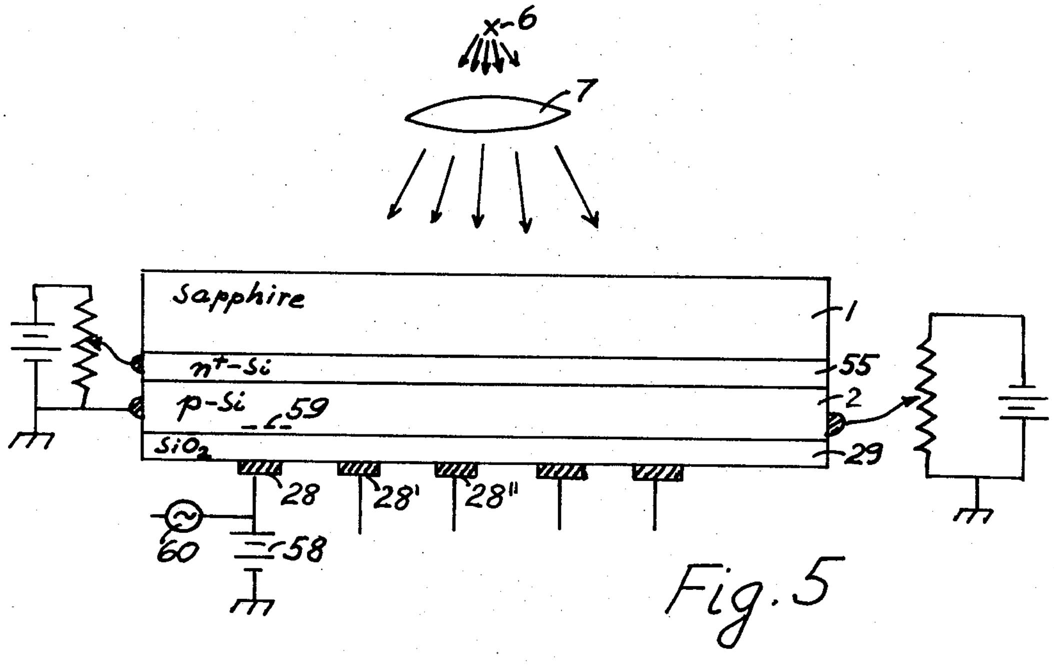
FIG. 5 shows another device of this invention having a multiplicity of MOS sensors along the channel.

FIG. 5 shows a device according to this invention which is similar to that of FIG. 2, but has a multiplicity of MOS capacitor sensors 28, 28′, 28″, etc., spaced along the p-channel 2 on $n^+$-gate 55.

Figure 6:
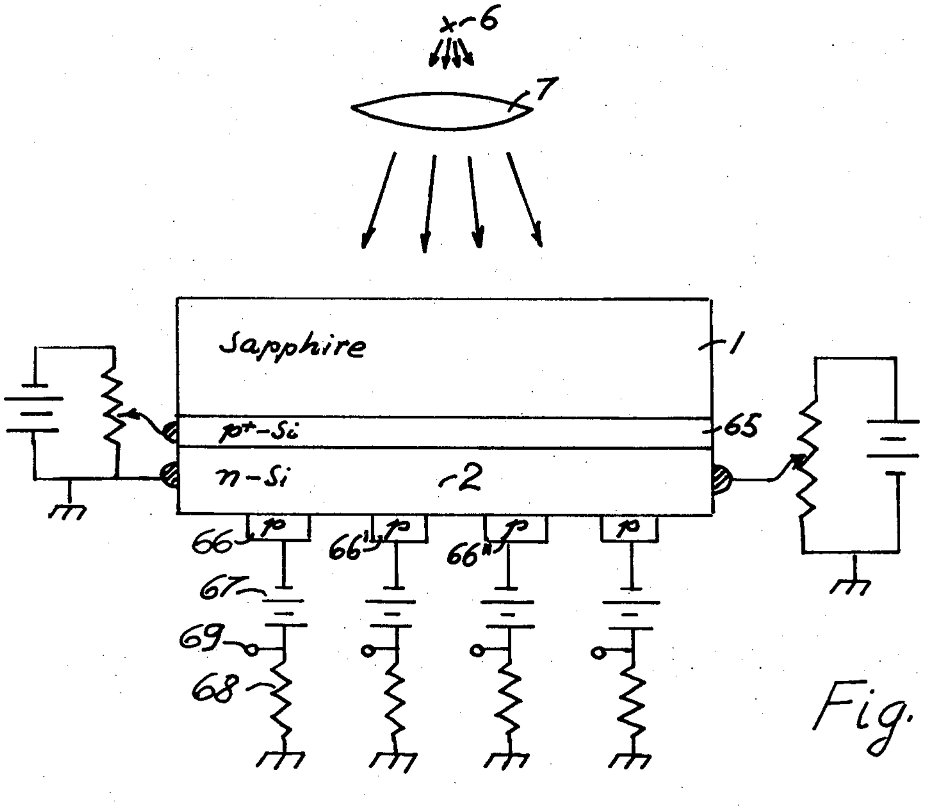
FIG. 6 shows another device of the invention having a multiplicity of p-n junction sensors along the channel.

FIG. 6 shows another device according to this invention, which is similar to that of FIG. 5, but has a multiplicity of biased p-collectors 66, 66′, 66″, etc., spaced along the n-channel 2 overlying $p^+$-gate 65. Reverse bias means 67 and load resistor 68 are indicated for collector 66. Terminal 69 serves to measure electric signal due to holes collected from 2 by reverse biased 66 and flowing through 68.

Bias arrangements for gate source and drain in FIGS. 5 and 6 are shown, but need not be described in detail since they are similar to those in previous figures. A. C. signal source 60 in circuit for MOS sensor 28 in FIG. 5 serves to measure MOS capacitance.

Figure 7:
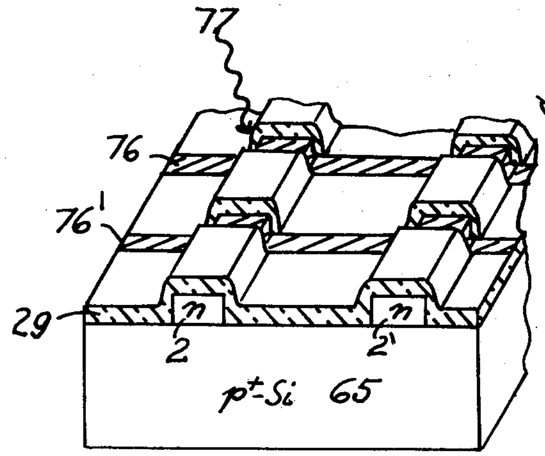
FIG. 7 shows a perspective view of a section of a network of sensors according to this invention.

FIG. 7 shows a perspective view on a portion of a two-dimensional network of devices similar to FIG. 6. This network includes parallel silicon n-chaNnels 2, 2′ on common silicon $p^+$-gate substrate 65. The channels are crossed by parallel conductors 76, 76′, making Schottky collector contacts with n-channels 2, 2′. Insulation of conductors 76, 76′ from gate substrate 65 by silicon oxide film 29 is shown.

Next, we shall discuss some inventive operational aspects of the devices shown in FIGS. 1–7. Let us consider, for instance, the device shown in FIG. 2. Assume the source and drain voltages biased sufficiently positive that the channel is pinched off. Illumination of point 21 at distance $l$ from source contact 3 generates electron-hole pairs near 21. The field in the p-n junction between channel 2 and gate 25 drives holes to gate and electrons to channel, thereby generating a photocurrent J across the junction. This photocurrent arises from electron-hole pairs generated in the junction depletion layer, as well as from holes generated in the n-channel, and electrons generated in the p-gate, which have reached the depletion layer by diffusion. Thus, light which is sufficiently strongly absorbed in the gate 25 that it does not reach the channel can still cause a junction photocurrent J due to diffusion of electrons to the depletion layer.

Below a critical light intensity, the photocurrent J entering the channel at 21 flows to source and gate. This requires the illuminated spot to achieve a potential $V_l$ for which $J = I(l, V_l, V_P) + F(L - l, V_l, V_P)$ in the case that $V_S, V_D > V_P$. The first term on the right side of this equation is the source current $I_S$ and the second term is the drain current $I_D$. Source and drain currents depend on light intensity through the potential value, $V_l$, which establishes itself at the illuminated spot. In the pinch-off range, $V_S, V_D > V_P$, source and drain represent an infinite impedance source of photocurrent. Because $F(l) \approx 1/l$, one has $I_S = (L - l/L)J$ and $I_D = (l/L)J$. These relations are illustrated in FIG. 8 for positions $l/L = 0$, ¼, ½, ¾ and 1 of the illuminated spot.

Figure 8:
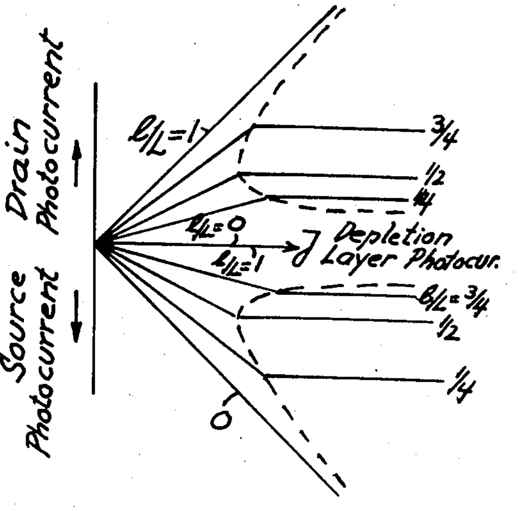
FIG. 8 illustrates the dependence of source and drain currents on illumination intensity for a device such as shown in FIG. 2.

For sufficiently strong light intensifies so that $V_l < 0$, the above-mentioned linear relations become invalid and source and drain currents become independent of light intensity as indicated by the horizontal lines in FIG. 8. Since they are also independent of source and drain voltages, provided these voltages are in the pinch-off or current saturation range, source or drain current provide a unique and simple indication of the position of the illuminated spot. The fact that source and drain currents become independent of illumination arises from the forward bias ($V_l < 0$) of the gate to channel junction, which causes a forward current across the junction compensating the excess photocurrent $J - J_2$ where $J_2$ is the photocurrent leading to $V_l = 0$.

The forward current across a portion of the depletion layer for light intensities for which $J > J_2$ may lead to minority carrier injection, as in the emitter of a bipolar transistor. Injected minority carriers can recombine in the channel to cause recombination radiation as illustrated by 23 in FIG. 2, or else injected minority carriers can activate a sensor, such as illustrated by the structures 26, 27 or 28 in FIG. 2.

The reversed bias gate to channel structure and the p-n junction or Schottky-type sensors located on the opposite side of the channel as shown, for instance, in FIGS. 6 and 7 represent multicollector bipolar transistors of extended base layer (= channel) and reversed bias common emitters. Forward bias of the emitter (= gate) by means of strong illumination triggers bipolar transistor operation.

Figure 9:
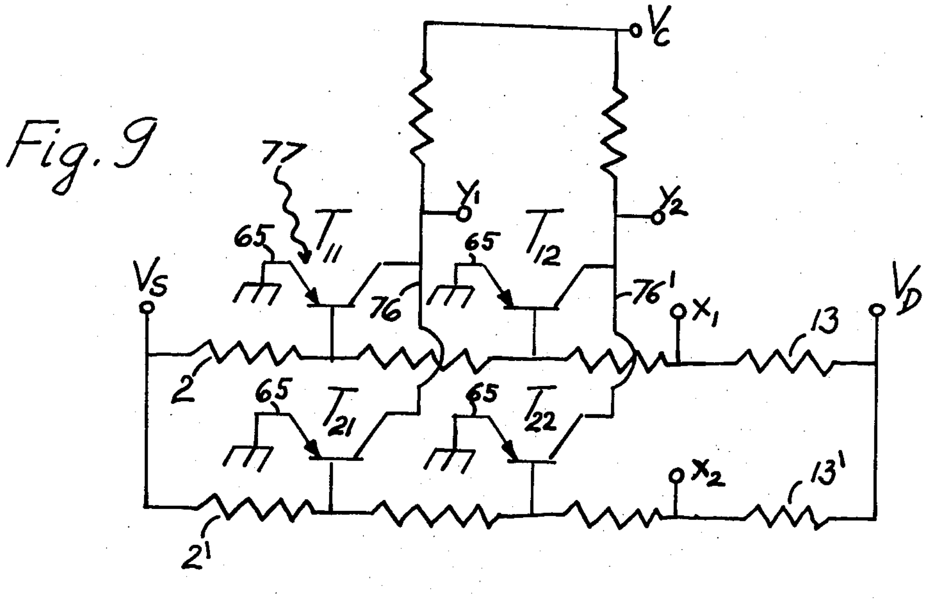
FIG. 9 shows an equivalent circuit for the network of FIG. 7.

FIG. 9 shows the equivalent circuit for FIG. 7 in terms of an interconnected bipolar transistor network $T_{11}$, $T_{12}$, $T_{21}$ and $T_{22}$. Only a 2 × 2 matrix is shown to simplify pictorial representation, although, in practice, larger matrices will be preferred. The majority (electron) photocurrent of a given channel, such as 2 and the minority (hole) photocurrent of a given collector, such as 76, are indicative of the location of the illuminated transistor $T_{11}$. Illumination in FIGS. 7 and 9 is indicated by wavy arrow 77. The distributed base resistors 2, 2′ in FIG. 9 are the n-channels 2, 2′ of FIG. 7; the collector connections 76, 76′ of FIG. 9 are the metallized layers 76, 76′ of FIG. 7 and the grounded emitters of 65 of FIG. 9 are the $p^+$ substrate 65 of FIG. 7.

The channel terminals are connected to potentials $V_S$ and $V_D$ through load resistors 13, 13′ with connections $x_1$, $x_2$ for measuring the majority carrier photosignal of the channels. Similarly, the collectors 76, 76′ are connected to collector potential $V_c$ through load resistors 78, 78′ with connections $y_1$, $y_2$ for measuring the minority carrier photosignals of the collectors. In the illustrated case of illumination of transistor $T_{11}$, signals would be obtained at terminals $x_1$ and $y_1$.

Next, we shall discuss another useful feature of our invention; namely, the creation of a potential extremum in a channel by illumination and its use for transport of minority carriers along the channel.

FIG. 10 illustrates the change of the potential distribution with light intensity along the n-channel of a device such as shown in FIG. 2 under spot illumination. We have assumed that source voltage is less than drain voltage and that the channel is not pinched off. In the absence of illumination, curve A, the potential gradually increases from source to drain. At illumination, an abrupt change of slope of potential distribution arises at the illuminated spot due to entrance of photoelectrons into channel. For sufficiently small illumination, curve B, the potential curve slopes upwards in both regions $0 < x < l$ and $l < x < L$. However, for stronger illumination, curve C, a potential minimum appears at position $l$, showing that electrons are driven from $x = l$ to $x = 0$ by the channel field. In other words, the source current has reversed sign. While the field drives electrons away from position $x = l$, it attracts and contains holes at that position. At very strong illumination, curve D, the potential of channel against gate at the illuminated spot becomes negative, i. e., a section of the gate junction becomes forward biased as has been mentioned previously. In this section, minority carriers can be injected from the gate to populate the potential extremum.

Figure 11:
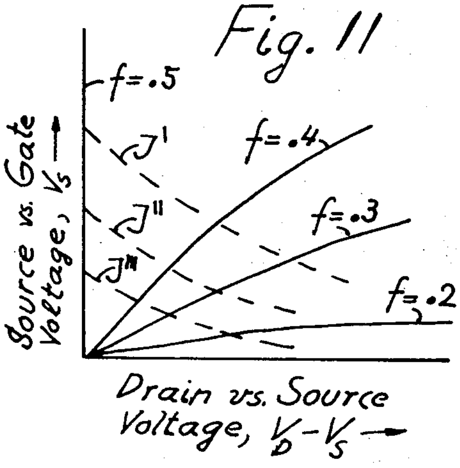
FIG. 11 illustrates the location of a potential extremum in a device such as shown in FIG. 1 under homogeneous channel illumination.

A potential extremum arises also in the case of homogeneous illumination of the entire channel length. Unlike the case of spot illumination, in the case of homogeneous illumination, the position of the potential extremum can be varied by means of the source or drain voltages or by the light intensity. FIG. 11 illustrates the variation of position $f$ pertaining to the potential extremum for which there is zero bias between channel and gate at the potential extremum. The position $f$ is expressed in terms of fractions of the channel length L. At source equal to drain voltage, the potential extremum is located halfway between source and drain, $f = 0.5$. With increasing drain versus source voltage, the potential extremum shifts toward the source.

Also shown in FIG. 11 as dotted lines are curves pertaining to fixed light intensities $J' > J'' > J'''$ and denoting the source and drain vs. source voltages for which the channel is at zero bias vs. the gate at the position of the potential extremum. In the region of bias voltages above a dotted line, the entire junction is reversed biased at the light intensity corresponding to the dotted line.

The faculty of the potential extremum to contain minority carriers and the possibility to shift the potential extremum by change in illumination or bias voltages enables the transport of minority carriers along channel to a preselected storage or sensing spot.

Figure 12:
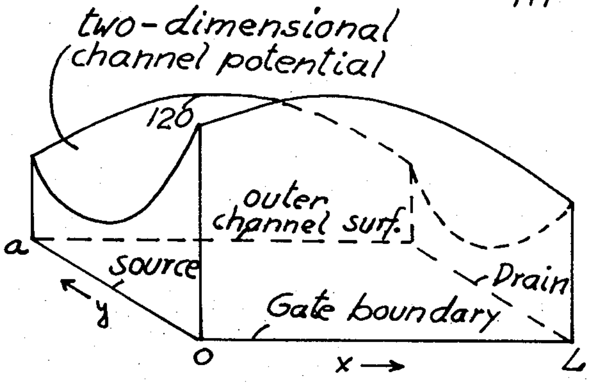
FIG. 12 illustrates a two-dimensional potential profile of the channel including the existence of a potential extremum at the outer channel surface.

Adding minority carriers to the potential extremum during transport can be prevented by utilizing a potential extremum for which the adjacent gate junction is still reversed biased. Loss of minority carriers from the potential extremum into the gate across the back biased depletion layer during transport can be prevented by an appropriate potential distribution across the channel. Such a potential distribution is illustrated in FIG. 12 for a p-channel device on a $n^+$ substrate gate, such as shown in FIG. 5. The saddle-shaped potential distribution arises from the potential maximum along the channel (x-direction in FIG. 12) due to illumination in combination with an electric field across the channel (y-direction in FIG. 12). The electric field near gate boundary $y = 0$ arises from the depletion layer between channel and gate. The electric field near the outer channel surface, $y = a$ may arise from a surface depletion layer due to positive surface states or oxide states; or else, it can be induced by a properly biased electrode, such as 28 on 29 in FIG. 5. Most importantly, a suitable electric field across the channel can be generated by an impurity gradient having an acceptor impurity concentration, which decreases as we proceed from $y = 0$ to $y = a$. Such a gradient can be obtained by outdiffusion of acceptors, or else by generating the p-channel 2 on the n-substrate 55 of FIG. 5 by ion implant.

Minority carriers (electrons in the p-channel) will be swept by the field distribution to the potential maximum 120 in FIG. 12. Loss of electrons from there may occur by surface recombination and utilization of these electrons for electric circuit functions has to be done, therefore, in times shorter than their lifetime by surface recombination.

Such utilization may comprise the shift of stored minority carriers along the surface to various sensors, such as indicated by the MOS sensors 28, 28′, 28″ in FIG. 5. Or else, these minority carriers can be removed from the channel by shifting them to various collectors, such as 66, 66′, 66″ in FIG. 6.

A preferred operational procedure for charge transfer of minority carriers along channel by means of shift of potential extremum is as follows: First, create a potential extremum by suitable combination of bias potentials and illuminations. Then, populate this potential extremum with minority carriers, e. g., by driving the adjacent gate regions into forward bias by using a sufficiently large light intensity to cause minority carrier injection. Then, decrease the light intensity, or else, increase source voltage $V_s$ or drain to source voltage $V_D - V_s$ so that one operates in the range above the J-curve shown in FIG. 11. In this case, the entire gate junction becomes reversed biased. Now, shift the potential extremum to the desired preselected position by manipulation of light intensity or bias potentials.

It should be noted that illumination capable of creating a potential extremum in the channel does not necessarily populate this extremum with minority carriers, since the light can be fully absorbed in the gate region before reaching the channel, and the photocurrent across the depletion layer into the channel comprises then only the majority carriers of the channel, which have reached the depletion layer by diffusion from the gate.

Another preferred means of populating a potential extremum in the channel with minority carriers comprises an induced surface inversion layer as source of minority carriers. For instance, if a potential maximum is formed in the p-channel 2 of the device illustrated in FIG. 5, and that maximum is shifted past MOS capacitor 28, some of the electrons induced at 59 by power supply 58 will be swept with potential maximum along the channel and may thus be transferred to other MOS capacitors, such as 28'. This procedure of populating the potential extremum can be aided by a decrease of the potential of power supply 58 when the potential maximum is adjacent to 28, thereby releasing some of the invention charge 59 to the shifting potential maximum.

The electric field along the channel is rather low near a potential extremum under homogeneous illumination as illustrated in FIG. 12. However, stronger fields can be obtained by spot illumination as illustrated in FIG. 10. Strong fields for shift minority carriers along the channel can be obtained by removing the illumination from one spot and applying it to a different spot by means indicated in FIG. 2. The field in the unilluminated channel section sweeps the minority carriers toward the newly created potential extremum at the position of the present illumination.

Since there are many different embodiments of our invention, it should be understood that said invention is not limited by the preferred embodiments, but encompasses all structures and devices defined by the following.

What is claimed is:

1. A photoelectric device comprising a semiconducting channel of one conductivity type, two spaced electrodes to said channel representing a source and a drain contact, means to provide a depletion layer along at least a portion of said channel, said depletion layer separating said channel from a conducting gate layer, means to illuminate said device by light generating a photocurrent across said depletion layer, said photocurrent changing the width of said channel and the potential distribution along said channel, thereby modifying the currents through said source and drain contacts in response to the special distribution and intensity of said illumination, said channel electrically biased in the blocking direction against said gate in absence of illumination, and said illumination sufficiently strong to forward bias a section of said channel against said gate.

2. The device of claim 1 whereby minority carriers are injected across said depletion layer along said forward biased channel section, and said injected minority carriers are recombining with majority carriers to provide light emission by injection luminescence.

3. The device of claim 1, including a sensor for minority carriers located on said channel, said sensor being activated by minority carriers injected along said forward biased channel section.

4. The device of claim 3 whereby said sensor is a p-n junction collector.

5. The device of the claim 3 whereby said sensor is a Schottky barrier collector.

6. The device of claim 3 whereby said sensor is a metal-insulator-semiconductor capacitor.

7. A photoelectric device comprising a semiconducting channel of one conductivity type, two spaced electrodes to said channel representing a source and a drain contact, means to provide a depletion layer along at least a portion of said channel, said depletion layer separating said channel from a conducting gate layer, means to illuminate said device by light generating a photocurrent across said depletion layer, said photocurrent changing the width of said channel and the potential distribution along said channel, thereby modifying the currents through said source and drain contacts in response to the spatial distribution and intensity of said illumination, said illumination of a sufficient intensity that a potential extremum forms along said channel, said extremum being attractive for minority carriers in said channel.

8. The device of claim 7 whereby said potential extremum is shifted along said channel by a change in said illumination.

9. The device of claim 7 whereby said potential extremum is shifted along said channel by a change of potential applied at least to one of said contacts to said channel.

10. The device of claim 7 whereby said potential extremum is shifted along said channel by combining a change of illumination with a change of potential applied to at least one of said contacts.

11. The device of claim 7, including means to generate an electric field across said channel in direction normal to said depletion layer, said field of such a polarity as to locate said potential extremum at the boundary of said channel opposite to said depletion layer.

12. The device of claim 11 whereby said field is built into the channel by a gradient of dopant concentration.

13. The device of claim 11, including means to populate said potential extremum with minority carriers.

14. The device of claim 13 whereby said potential extremum is populated with minority carriers at a first position; said potential extremum is then shifted to a second position, thereby transferring at least some of said minority carriers populating said potential extremum to said second position.

15. The device of claim 13, including an inversion region at said channel boundary, said means to populate comprising minority carriers from said inversion region.

16. The device of claim 15 whereby said inversion region is induced in a portion of the surface of said semiconducting channel by a potential applied at an electrode spaced from said surface by a solid insulating film.

17. The device of claim 13 whereby said means to populate comprises a forward biased section of said depletion layer adjacent to said potential extremum, whereby minority carriers are injected into said channel at the position of said potential extremum.

18. The device of claim 17 whereby the potential of said potential extremum is changed after said population with minority carriers so that the adjacent depletion layer is now reverse biased.

19. A high impedance semiconducting sensor for the position of a light spot, said sensor comprising (i) a semiconducting channel of length large compared to the light spot and located to expose a section of said sensor along said channel to said light spot; (ii) a depletion layer along said channel which separates said channel from a gate layer; (iii) an electrical contact to each terminal of said channel and another contact to said gate layer; (iv) means to bias at least one of said contacts to a terminal of said channel with respect to said gate layer so that said channel is electrically pinched off at said terminal; whereby the electric current through said terminal becomes independent of said terminal bias, which is commonly known as saturation; (v) the light of said light spot of a sufficiently short wavelength to generate a photocurrent across said depletion layer, thereby affecting said electric current through said terminal; (vi) said light of sufficient intensity so that said saturation current becomes substantially independent of said light intensity, whereby said saturation current becomes indicative of the position of said illumination of said channel and is substantially independent of said light intensity and of said terminal voltage.

20. A semiconducting photoelectric device, comprising a semiconducting channel having a source and a drain terminal; said channel line on one side by a depletion layer which separates said channel from a gate layer; means to bias electrically said terminals against said gate layer; means to illuminate said channel with radiation causing a photoelectric current across said depletion layer, said radiation being sufficiently intense to cause a potential extremum in the channel; means to shift the position of said potential extremum along said channel; another side of said channel lined by a multiplicity of sensors for minority carriers in the channel; said sensors spaced in the direction of said channel from each other; said sensors electrically activated in a selective manner, by said shifting of said potential extremum.

21. The device of claim 20 whereby said selective activation is caused by said potential extremum biasing in the forward direction a section of said depletion layer separating said channel and said gate thereby causing minority carrier injection into said channel, said section located opposite to a selected sensor.

22. The device of claim 20 whereby said selective activation is caused by minority carriers already contained by said potential extremum when still located at a position spaced from a selected sensor, said minority carriers subsequently moved to the position of said selected sensor by said shift of said potential extremum.

23. A semiconducting device comprising a semiconducting substrate of one conductivity type hereafter referred to as gate, a thin semiconducting layer of the opposite conductivity type hereafter referred to as channel, said channel overlying said gate and separated from said gate by a p-n junction, source and drain contacts to said channel, means to bias said channel electrically against said gate and means to illuminate said device to generate a potential extremum in said channel between said source and said drain, an insulating layer on the surface of said channel opposite to said gate, contacts on said insulating layer spaced along said channel as to provide a multiplicity of metal-insulator-semiconductor capacitors with said channel, charge transfer of minority carriers among said metal insulator semiconductor capacitors, said charge transfer induced by a shift of said potential extremum in said channel, said shift caused by a change in combination of bias conditions at the terminals of said channel and of illumination.

24. The structure of claim 23 whereby said semiconductor channel comprises an epitaxial silicon film of one conductivity type separated from a transparent insulating substrate by an epitaxial silicon film of the opposite conductivity type, said film of the opposite conductivity type being the gate to said channel, at least part of the outer surface of said channel covered with an insulating silicon compound, electrodes on said insulating compound, said illumination impinging on said epitaxial silicon film of the opposite conductivity type through said transparent insulating substrate.

25. A photoelectric device comprising a semiconducting channel of one conductivity type, two spaced electrodes to said channel representing a source and a drain contact, means to provide a depletion layer along at least a portion of said channel, said depletion layer separating said channel from a conducting gate layer, means to illuminate said device by light generating a photocurrent across said depletion layer, said photocurrent changing the width of said channel and the potential distribution along said channel, thereby modifying the currents through said source and drain contacts in response to the spatial distribution and intensity of said illumination, said means to illuminate comprising a multiplicity of light sources, optical means to focus the light emitted from said light sources on said channel so that the light of each light source illuminates a different section of said channel, said different sections spaced in direction of said channel and means to activate said light sources individually, so that the illuminated section can be shifted along the channel.

26. An integrated two-dimensional network of photosensitive devices for electric registration of a light spot, said network comprising i. a set of spaced channels of field effect transistors,
ii. crossed by a set of spaced sensors for minority carriers in said channels,
iii. said spaced channels on a common gate, each channel separated from said gate by a depletion layer,
iv. minority carriers injected into one of said channels from said gate upon illumination by said light spot, said minority carriers activating one of said sensors located adjacent to said illumination whereby the photocurrents in said illuminated channel and in said adjacent sensor define the position of said illuminated spot.

* * * * *